United States Patent [19]
Violette et al.

[11] 3,738,790
[45] June 12, 1973

[54] APPARATUS FOR EXTRUDING A FILM OF THERMOPLASTIC MATERIAL HAVING PREDETERMINED ZONES OF DIFFERENT FILM THICKNESS

[76] Inventors: Glenn M. Violette, R.D. 1, Greenwich; Leon J. Paquin, 18 Achley Pl., Glens Falls, both of N.Y.; James A. Lock, 3762 San Juan Hill, Mobile, Ala.

[22] Filed: Nov. 3, 1970

[21] Appl. No.: 86,626

Related U.S. Application Data

[62] Division of Ser. No. 835,837, April 3, 1969, which is a division of Ser. No. 700,968, June 26, 1968, abandoned.

[52] U.S. Cl. ............................... 425/467, 425/380
[51] Int. Cl. ............................................. B29f 3/04
[58] Field of Search .................... 18/12 DM, 12 DS, 18/12 B, 12 R, 13 D, 13 W; 425/206, 376, 461, 467, 380

[56] References Cited
UNITED STATES PATENTS

| | | |
|---|---|---|
| 3,217,358 | 11/1965 | Kihara ................................ 425/376 |
| 3,063,095 | 11/1962 | Limbach ............................. 425/376 |
| 3,191,228 | 6/1965 | Schluter ............................. 425/197 |
| 3,132,377 | 5/1964 | Allentaugh et al. ............... 18/12 DS |
| 2,686,335 | 8/1954 | Gross ................................. 18/12 DS |
| 3,527,859 | 9/1970 | Fairbanks ......................... 18/12 DS |
| 3,482,278 | 12/1969 | Thompson et al. ................ 18/12 DS |

FOREIGN PATENTS OR APPLICATIONS 890,136  0/1962  Great Britain ..................... 425/376

*Primary Examiner*—J. Spencer Overholser
*Assistant Examiner*—David S. Safran
*Attorney*—Robert S. Sanborn, Walt Thomas Zielinski, Jay S. Cinamon and Howard R. Goldberg

[57] ABSTRACT

The present invention contemplates an apparatus, a process and a product produced by the process, whereby preselected areas of a moving paperboard substrate are coated with a thermoplastic film having zones of different thickness, so that the substrate areas are in predetermined registry with the film zones, by employing a threaded deckle rod during the extrusion of the thermoplastic film. The threaded deckle rod imparts the varying thickness profile to the film.

7 Claims, 7 Drawing Figures

PATENTED JUN 12 1973 3,738,790
SHEET 1 OF 2
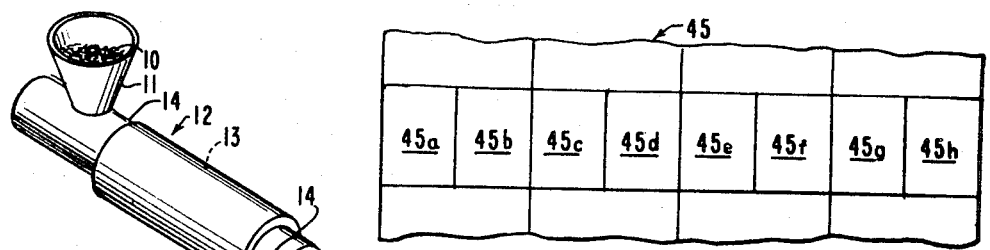
FIG. 5
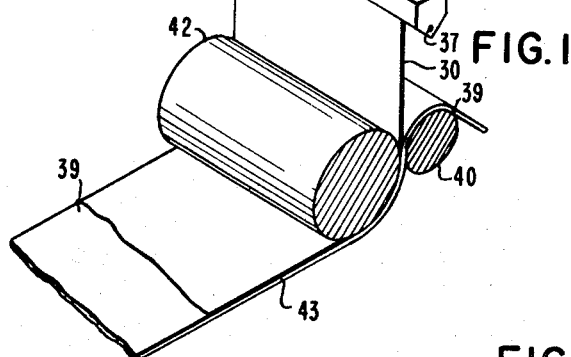
FIG. 1
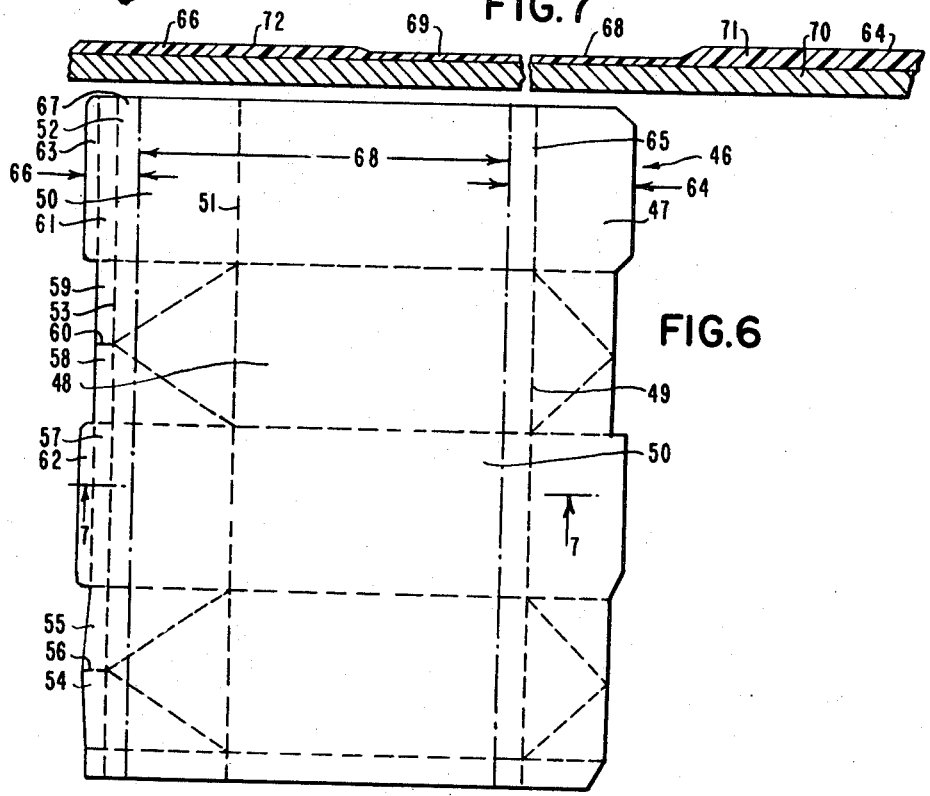
FIG. 7
FIG. 6

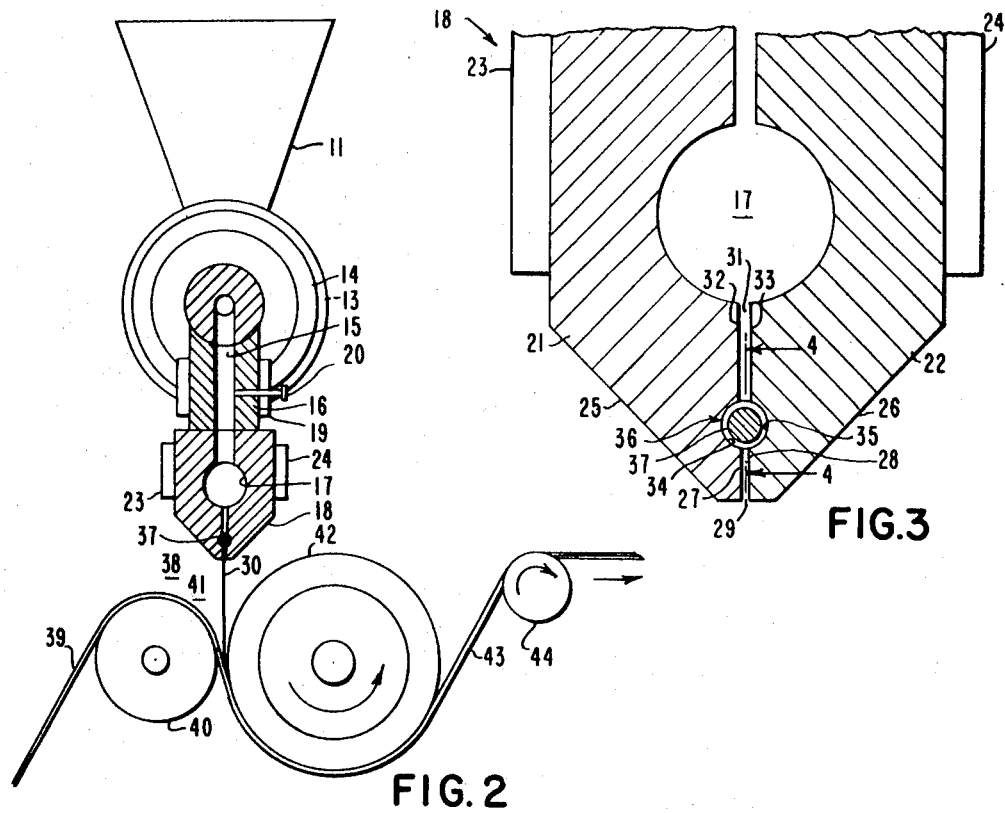
FIG. 2
FIG. 3
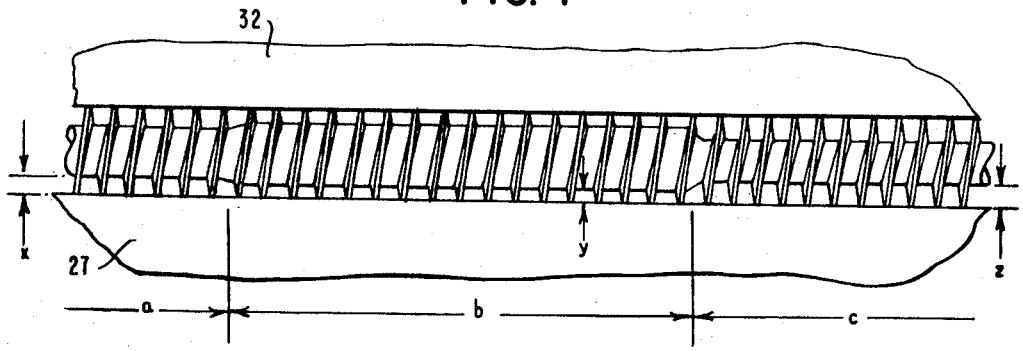
FIG. 4

APPARATUS FOR EXTRUDING A FILM OF THERMOPLASTIC MATERIAL HAVING PREDETERMINED ZONES OF DIFFERENT FILM THICKNESS

This is a division of application Ser. No. 835,837, filed Apr. 3, 1969, which is a division of application Ser. No. 700,968, filed Jan. 26, 1968, now abandoned.

The present invention relates to an apparatus and a process for coating substrate material, and the product produced thereby. More particularly, it relates to coating or laminating a substrate material with a unitary thermoplastic film having a plurality of predetermined zones of different film thickness.

It has long been a problem in the carton industry to produce polyethylene coated carton blanks, which, when erected as cartons for fluids, such as milk, juice, etc., combine both adequate film coating strength and heat seal properties, so as to prevent leakage, while minimizing the amount of polyethylene employed. Heretofore, it has been the practice in the industry to apply a coating of polyethylene film of uniform thickness to all the internal surfaces of the carton blank, including the bottom panel section, the side panel section and the top panel section, to achieve the desired properties. Since it has now been found that a uniformly thick coating of polyethylene is not necessary on all internal surfaces of the erected carton to achieve the desired properties, unnecessary cost is involved in using an uniform coating.

Therefore, it is an object of the present invention to provide a product having a predetermined variable film weight profile coating of a thermoplastic film on a substrate material.

It is another object of the present invention to provide apparatus for delivering a predetermined variable film weight profile coating of a thermoplastic film on a substrate material.

It is another object of the present invention to provide a process for delivering a predetermined variable film weight profile coating of a thermoplastic film on a substrate material.

It is another object of the present invention to provide a carton erected from a carton blank whose internal surface area has a predetermined variable film weight profile coating of a thermoplastic film.

The present invention contemplates the insertion of flow regulating means into the die body of a conventional extrusion die. The flow regulating means is provided with threaded segments of varying or different thread depths so that, as thermoplastic material exits from the extruder in the form of an integral film, and prior to being coated to a substrate material, it will have a predetermined profile of varying thickness. Upon coating, or laminating, the film to preselected areas of the substrate material, the thermoplastic film retains its zones of varying thickness.

Other objects, advantages and features will become apparent from the following more detailed description, when read in conjunction with the drawings, wherein:

FIG. 1 is an isometric view of an extrusion apparatus in accordance with the present invention;

FIG. 2 is a front view of the extrusion apparatus showing the die body and adapter thereof in section;

FIG. 3 is an enlarged fragmentary sectional view of the die body of FIG. 2;

FIG. 4 is a cross-sectional view, taken substantially along the line 4—4 of FIG. 3, showing the inner parts of the die body and a three-segment fragment of the flow regulating means of the present invention in elevation;

FIG. 5 is a plan view of a short length of paper stock from which eight blanks may be cut;

FIG. 6 is a plan view of a carton blank in accordance with the present invention;

FIG. 7 is an exaggerated sectional view, taken along the line 7—7 of FIG. 6, showing a is material coated with a thermoplastic film having a variable thickness profile.

Referring to FIGS. 1 and 2, the thermoplastic material 10, e.g., polyethylene, which is in pelletized form, is introduced into hopper 11. From hopper 11, the resin falls into a screw extruder, generally designated at 12. Heating elements 13 are provided along the length of the extruder 12. The rotating screw flights (not shown), within barrel 14, cause the resin to be forced forward within the screw extruder. As the resin moves forward, it is heated, melted, mixed and compressed. As the melted resin exits from the extruder barrel, it passes into a chamber 15, provided in an adapter 16. Chamber 15 is in communcation with the extruder 12 at one end thereof, and at its other end is in communication with a header or manifold 17 of a die body 18. The chamber 15, within the adapter 16, serves to guide the resin melt from the extruder to the die body with a minimum of resin hang-up. Heating elements 19 are disposed on either side of the adapter 16 to maintain the temperature of the melt constant as it passes down chamber 15. A thermocouple 20 is mounted in the adapter, so that it protrudes into the melt and indicates the temperature of the melt close to the coating die.

The die body 18 is comprised of two mated die parts or halves, 21 and 22. Heating elements 23 and 24 are provided on either side of die parts 21 and 22. The lower part of the die body has a generally V-shaped cross-section formed by opposable jaws 25 and 26, which are adjustable by conventional push-pull screw or bolt means (not shown). Die jaws 25 and 26 each have flat, parallel, internal surfaces which define die lands 27 and 28, respectively. The die lands are in opposing juxtaposition and in spaced apart relationship to one another, and thus define a restricted passageway, i.e., extrusion orifice 29, from which the thermoplastic exits in the form of a molten thermoplastic film 30.

The extrusion orifice 29 from which the film 30 exits will usually have a width of from about 0.0050 inches to about 0.060 inches; preferably, the width is from about 0.010 inches to about 0.030 inches, and even more preferably about 0.020 inches.

Header 17 is a hollow, central portion which extends the length of the die body 18 and is disposed centrally of the die body. An extrusion slot 31, defined by wall elements 32 and 33, is formed in the die body 18 and communicates at one end with the header 17 and at its other end with extrusion orifice 29. The cross-sectional area of extrusion slot 31 is greater than the cross-sectional area of extrusion orifice 29, which is the restricted passageway defined by flat parallel die lands 27 and 28. Extrusion slot 31 has a uniform cross-sectional area throughout its length, but, optionally, the extrusion slot can have a somewhat tapered configuration from top to bottom. Each of the wall elements 32 and 33 of extrusion slot 31 are provided with a longitudinally extending semi-circular recess or groove, namely 34 and 35, at the end of extrusion slot 31 and proximate extrusion orifice 29. When the grooves are placed in facing non-contiguous relationship they define a channel 36.

Channel 36 is adapted to accommodate an internally disposed, thermoplastic material flow regulating or metering means, having groove means disposed thereon. In its preferred embodiment, the flow regulating or metering means is an internally disposed cylindrical rod 37, which has a plurality of threaded segments running about its circumference and along its length. Preferably, the threads have a helical design, i.e., a continuous spiral. The rod is divided into a plurality of threaded segments, each of said segments having threads of varying or different depth. As the thermoplastic resin, which is now in melt form, passes down the extrusion slot 31 and then passes between and over the various segments of the rod 37, defined by the threads machined therefrom, a profile of varying thickness is imparted to the film 30 by the various thread segments. As can be seen most clearly by reference to FIG. 4, where only a fragment or a part of a rod is shown as a convenient means of illustrating the invention, each of the segments has a different thread depth. The film zone passing between and over the threads in segment "$b$" has the least thickness, and hence the least weight, since the threads in that segment have the shallowest thread depth, namely "$y$." The film zone passing through and over segment "$a$" of the threaded rod, has a greater thickness than the film passing between and over segment "$b$," since the thread depth "$x$" of the threads in this segment is greater than the thread depth "$y$." The film zone which passes between and over segment "$c$," having threads with the greatest thread depth, namely "$z$," will have the thickest profile, and hence the greatest film weight. Thus, the thermoplastic film has a plurality of zones of different film thicknesses which conform to the depth of the threads in the rod segments between and over which it has passed. As the profiled film flows past the threaded rod and then down and through the extrusion orifice 29 and exits therefrom, the film 30 retains the profile of varying thickness imparted to it by rod 37. After passing through a drawdown area or air gap 38, the film 30, which is in a molten state, contacts preselected areas of a moving web of substrate material 39, which is carried on a pressure roll 40 and which is rotating in a clockwise direction, just prior to reaching nip 41 between pressure roll 40 and chill roll 42, which is rotating in a counter clockwise direction, and results in a thermoplastic-coated substrate 43. The coated substrate 43 passes from the driven chill roll 42, which is water-cooled, and is advanced onto guide roll 44 and then to a collection roll (not shown). The substrate 39, which is preferably paperboard, is supplied to pressure roll 40 from a supply roll (not shown). In any particular coating operation the film zones and the underlying substrate areas are equal in number and dimension.

The thermoplastic material employed in the practice of the present invention can be selected from the class consisting of polymers and copolymers of the lower alkyl olefins, halogenated alkyl olefins, aryl olefins and alkyl amides. Illustrative of said class of polymers and copolymers are polyethylene, polypropylene, polystyrene, polybutadiene, polyvinylchloride, polyurethane, polymethyl methacrylate, nylon, etc. Polyethylene produced in accordance with the high, medium, or low density processes is the preferred thermoplastic for use in the practice of the instant invention.

The present invention may utilize a variety of different substrate materials. Exemplary of such substrate materials, but not limited thereto, are: paper, paperboard, glassine, cellophane, polyester film, polymeric flims, metal foil, cloth and glass fiber.

Though the portion of the threaded rod 37 illustrated in FIG. 4 is depicted as being divided into three separate and distinct segments, the threads in each of said segments having different thread depths, it is to be understood that such representation is merely illustrative and a convenient means of depicting the rod, and is in no sense to be considered limiting either as to (1) the number of segments, (2) the depth of the threads within a segment or (3) the particular sequential arrangement of the rod segments. The total number of rod segments are limited only by the length of the rod and the number of threads which can be machined thereon. Depending upon (1) the particular coating operation, (2) the width of the moving paperboard web, and (3) the number and size of the cartons ultimately to be blanked from the web, the rod is divided into a sufficient number of segments to provide the required number of film zones to preselected areas of the moving web. Necessarily, the total number of film zones is equal to the number of threaded rod segments.

Although it is preferable in any single particular process that the various segments be sequentially repetitive, along the rod's length, the requirements of a particular coating process might dictate the use of "$n$" number of segments, where "$n$" can be any number equal to or greater than two, depending on the length of the rod, and each segment might have a different thread depth. A particular process might dictate having a rod segment with a zero thread depth for at least one, but less than all, of the segments, and is to be considered as falling within the scope of the present invention. The threaded deckle rod is machined to have from about 15 to about 50 threads per linear inch, preferably from about 25 to about 40 threads per linear inch, and even more preferably about 32 threads per linear inch. It is preferred that the depth of the threads in any particular rod segment be constant. However, depending upon the particular coating operation, certain rod segments can be machined so that the depth of the threads within the segment will vary, so as to present a rod segment having a tapered appearance. The depth of the threads from one segment to another segment, naturally, will vary. The thread depth within any one particular segment can be from about 0.005 inches to about 0.050 inches. Preferably, the thread depth within any one segment is from about 0.010 inches to about 0.025 inches. Although it is preferred to employ an American Standard V-thread, other types of threads such as square, sharp-V, etc., can be employed with equal advantage.

The threaded deckle rod 37 contained in the channel 36, formed by the semi-circular grooves 34 and 35 in the walls 32 and 33 of the extrusion slot 31, must, of necessity, be proximate the extrusion orifice 29. If the rod were distant from the extrusion orifice, the profile of varying thickness imparted to the film by the threaded rod would tend to level out while passing between the die lands. The film would, in other words, tend to lose its "memory." The term "memory" is defined for the purpose of this disclosure as the ability of a film having an imparted profile of varying thickness to retain its profile throughout the extruding and coating operations.

Although it is preferred to employ a cylindrical deckle rod, i.e., flow regulating means, having a geometrically uniform cross-section along its length prior to machining the threads thereon, a deckle rod having elliptical, triangular, circular, diamond, spherical, hexagonal, trapezoidal, octagonal, etc., cross-sections may be employed with equal facility and advantage. Thus, it is apparent that the desired geometrical configuration of the internal flow regulating means 37, which is adapted to be accommodated in channel 36, perforce determines the geometry of the grooves to be machined out of wall elements 32 and 33 and the resultant channel 36 created thereby. The semi-circular grooves 34 and 35 when placed in facing non-contiguous relationship define an interrupted circular channel 36 adapted to accommodate rod 37. The channel is interrupted in the sense that the channel is open at the top to permit the thermoplastic material to flow out of the extrusion slot and is open at the bottom to permit the thermoplastic material to flow into the extrusion orifice after passing between and over the threaded deckle rod. Naturally, if it is desired to employ a non-cylindrical deckle rod, each of the wall elements 32 and 33 would have grooves provided therein which would correspond to the aforementioned geometrical variants for the deckle rod itself. The rod is in frictional engagement with the grooves to prevent movement or rotation of the rod.

Though it is preferred for reasons of convenience that the flow regulating or metering means be threaded, and in particular helically threaded, in order to impart the profile of varying thickness to the film, other groove-type means can be employed with advantage. The flow regulating means can be serrated, notched, rifled, scored, discontinuously grooved, e.g., annular grooves, etc., so as to produce a thermoplastic film having a profile of varying thickness.

In its preferred embodiment, the present invention contemplates the use of but a single, internally disposed, threaded, cylindrical deckle rod. However, two threaded rods could be inserted from either end of the die body which would meet at the center or other intermediate point of the die body. Additionally, the threaded rod can be either symmetrical or asymmetrical with respect to both the number of threaded segments and also the thread depth of the segments disposed on either side of the midpoint of the rod.

In its preferred embodiment, the present invention finds application in the thermoplastic coating of the internal surfaces of carton blanks, capable of providing erected and filled cartons which are reinforced at these sites which are subjected to the greatest stress during forming, handling and shipment. Typical of the cartons which derive the greatest benefit, by way of internal reinforcement against leakage, are those which are designed to hold liquids, such as milk and juice.

FIGS. 5, 6, and 7 offer a convenient means for describing an embodiment of the instant invention. It is to be understood that, while the discussion which follows is applicable to a particular commercial embodiment of the present invention, it is not to be considered as limited thereto. FIG. 5 depicts a short length of stock 45, preferably paperboard, subsequent to being coated in accordance with the present invention and after a preliminary slitting operation which divides stock 45 into a width sufficient to provide eight distinguishable blanks, namely 45a through 45h, inclusive. Subsequent to further cutting and scoring operations, which result in a finished carton blank as shown in FIG. 6, conversion of blank precursors 45a through 45h, inclusive, yax' eight gable-topped carton.

FIG. 6 depicts a carton blank, generally indicated at 46, subsequent to coating, cutting, scoring and blanking operations, but prior to conversion into a single gable-topped carton. Blank 46 comprises a bottom panel section 47 foldably connected to a side panel section 48 along a first transverse fold line 49. Side panel section 48 is foldably connected to a top panel section 50 along a second transverse fold line 51. Top panel section 50 is foldably connected to a rib panel section 52 along a third transverse fold line 53. Rib panel section 52 comprises, (1) a pair of inner rib panels 54 and 55 connected to each other along a short perpendicular score line 56 and connected to top panel section 50 along third transverse fold line 53, (2) an outer rib panel 57 which is foldably connected to top panel section 50 along third transverse fold line 53, (3) a second pair of inner rib panels 58 and 59 connected to each other along a short perpendicular score line 60 and connected to top panel section 50 along third transverse fold line 53, and (4) a second outer rib panel 61 which is foldably connected to top panel section 50 along third transverse fold line 53. Surmounting outer rib panels 57 and 61 are sealing flaps 62 and 63 which are foldably connected to said outer rib panels.

During the coating of the unitary, profiled, thermoplastic film to the matte side of the moving paperboard web, the deckle rod segments of differing thread depths and, perforce, the film zones of different film thickness are in registered alignment with each other, and also with preselected areas of the moving paperboard web.

Since it is desired to have the thickest, and hence the heaviest, zone of the film coated onto area 64, which comprises bottom panel section 47 and a portion or margin 65 of side panel section 48, immediately adjacent first transverse fold line 49, because the erected carton is most susceptible to damage and leakage in the area, segment "c" of rod 37 which has the greatest thread depth, namely "z," is aligned with area 64 during the coating operation, and prior to cutting, scoring and blanking. It is preferred that area 64 be coated with from about 16.0 to about 21.0 lbs. of polyethylene/ream of paperboard so as to insure a durable carton bottom. For the purposes of the present invention, a ream is to be deemed equal to 3,000 square feet of paperboard. Since it is desired to have the film zone of intermediate thickness, and hence of intermediate film weight, coated onto area 66, which comprises rib panel section 52 and sealing flaps 62 and 63 and also a portion or margin 67 of top panel section 50 immediately adjacent third transverse line 53, because the erected carton is to a somewhat lesser extent susceptible to damage and leakage in this area, segment "a" of rod 37 which has an intermediate thread depth, namely "x," is in registered alignment with area 66 during the coating operation. The application of a film zone of intermediate weight and thickness to area 66 insures good top sealing properties. It is preferred that area 66 be coated with from about 14.0 to about 18.0 lbs. of polyethylene/ream of paperboard. Since area 68, which comprises the remainder of side panel section 48 and top panel section 50 which lie between side panel portion or margin 65 and top panel portion or margin 67, is the least susceptible to damage and leakage, it is in registered alignment with segment "b" of rod 37 which has the least thread depth, namely "y." Thus, area 68 will be coated with the thinnest zone of film and, hence, of lightest film weight. It is preferred that area 68 be coated with from about 9.0 to about 12.0 lbs. of polyethylene/ream of paperboard.

The gloss side of the paperboard web, which will form the exterior of the erected carton, is coated, as in conventional, with a polyethylene film of uniform thickness and weight.

As can be seen most clearly by reference to FIG. 7 which is an exaggerated sectional view taken along the line 7—7 of carton blade 45 in FIG. 6, thermoplastic film zone 69, the thinnest film zone, is coated to area 68 of a paperboard substrate, which is generally indicated at 70. It is preferred that film zone 69, the thinnest film zone, have a thickness of from about 0.0005 inches to about 0.001 inches. Thermoplastic film zone 71, which is the thickest film zone, is coated to area 64 of paperboard substrate 70. It is preferred that film zone 71, the thickest film zone, have a thickness of from about 0.001 inches to about 0.002 inches. Thermoplastic film zone 72, the film zone of intermediate thickness, is coated to area 66 of paperboard substrate 70. It is preferred that film zone 72, which is of intermediate thickness, have a thickness of from about 0.0007 inches to about 0.0011 inches.

From the foregoing, it is apparent that, by utilizing the process and apparatus of the instant invention, a thermoplastic coated substrate product is obtained, whose thermoplastic coating has a predetermined profile.

Although, in its preferred embodiment, the present invention is directed to coating the inner surfaces of cartons, e.g., milk cartons, juice cartons, cartons for liquids, etc., it is not to be considered as limited to such application. The present invention is applicable to a variety of applications, wherein a predetermined profile of thermoplastic film having a plurality of zones of different thickness is sought to be coated to preselected areas of a substrate material.

The following example is set forth to illustrate more clearly the principle and practice of this invention. It is to be understood, of course, that the invention is not limited to this specific example.

EXAMPLE 1

Portions of two lots of paperboard stock, designated as trial boards A and B, normally used in the construction of milk cartons had their matte surfaces coated with a profiled film of Bakelite polyethylene, having a plurality of zones of different film thickness, in accordance with the present invention. A 120 inch Black-Clawson die was employed with the extrusion orifice set at a width of 0.020 inches and having land surfaces one inch in length. The deckle rod employed had a ¼ inch outer diameter. The line speed of the extruder was about 700 feet per minute. Other portions of the same lots of paperboard stock, referred to above, were coated in a conventional manner with a uniform film coating of Bakelite polyethylene to serve as a control. The paperboard stocks coated in accordance with the present invention and the control stocks coated in conventional fashion, were both converted into milk cartons (designated "Trial" and "Control", respectively) and evaluated in accordance with standard industry testing procedures. The results of the evaluation are presented in Tables 1 and 2 below. From an examination of the results, it is evident that (1) cartons coated in accordance with the present invention yield considerable savings, insofar as the amount of polyethylene consumed is concerned, and (2) carton quality is equal to, or superior than, cartons coated in the conventional manner.

TABLE 1

| Board Type | | A Control | A Trial |
|---|---|---|---|
| Test Results | | | |
| Matte Film weight lbs./3000 sq. ft. | Bottom | | 19.2 |
| | Middle | | 11.4 |
| | Top | | 16.5 |
| | Average | 16.0 | 13.1 |
| Bottom Durability, homogenized milk (9 cartons per sample) leaks/cartons leaking | | | |
| Regular test: 180-minute vibration | | 6/3 | 2/2 |
| High Moisture test: 100-minute vibration | | 7/6 | 8/6 |
| Total | | 13/9 | 10/8 |
| Top seal quality (5 cartons per sample) Channel leaks/side seam leaks SP machine | | | |
| | 1090°F | 1/0 | 1/0 |
| | 1125°F | 0/0 | 0/0 |
| | 1200°F | 0/0 | 0/0 |
| | 1290°F | 1/3 | 0/2 |
| Total | | 2/3 | 1/2 |

TABLE 2

| Board Type | | B Control | B Trial |
|---|---|---|---|
| Test Results | | | |
| Matte Film weight lbs./3000 sq. ft. | Bottom | | 19.7 |
| | Middle | | 11.6 |
| | Top | | 16.3 |
| | Average | 15.2 | 13.1 |
| Bottom Durability, homogenized milk (9 cartons per sample) leaks/cartons leaking | | | |
| Regular test: 180-minute vibration | | 6/6 | 2/2 |
| High Moisture test: 100-minute vibration | | 10/7 | 7/5 |
| Total | | 16/13 | 9/7 |
| Top seal quality (5 cartons per sample) Channel leaks/side seam leaks SP machine | | | |
| | 1090°F | 1/0 | 1/0 |
| | 1125°F | 0/0 | 1/0 |
| | 1200°F | 0/0 | 0/0 |
| | 1290°F | 0/5 | 0/0 |
| Total | | 1/5 | 2/0 |

What is claimed is:

1. Apparatus for extruding a film of thermoplastic material having predetermined zones of different film thickness, which comprises:

a. a die body comprising two die halves, the lower parts of each of said die halves having opposable jaws, each of said opposable jaws having internal parallel land surfaces which are in opposing spaced apart relation-ship to one another, said die lands defining an extrusion orifice through which the film exits from the die body, said die body having a longitudinally extending header disposed centrally of said die body and a pair of wall elements defining a downwardly extending extrusion slot in communication with said header; and b. a non-rotating thermoplastic flow regulating means positioned in said extrusion slot proximate said extrusion orifice, said flow regulating means having a plurality of segments each having a plurality of grooves disposed thereon, the grooves in one segment being of a different depth than the grooves in the other of said plurality of segments, while the grooves within a segment are of equal depth, whereby a profile of varying thickness is imparted to the thermoplastic film prior to exiting from the die body.

2. The apparatus as recited in claim 1 in which said flow regulating means having a plurality of grooves is a rod which is threaded.

3. The apparatus as recited in claim 2 in which the threaded rod is helically threaded.

4. The apparatus as recited in claim 3 in which the thread depth within a particular one of said segments is from about 0.005 inches to about 0.050 inches.

5. The apparatus as recited in claim 1 in which each of the wall elements defining said extrusion slot has a recess provided therein, each of said recesses being in facing non-contiguous relationship to one another and extending the length of said extrusion slot, said recesses defining a channel adapted to accommodate said flow regulating means.

6. The apparatus as recited in claim 5 in which said channel formed by said recesses in said extrusion slot is proximate said extrusion orifice.

7. The apparatus as recited in claim 6 in which said flow regulating means is a helically threaded rod.

* * * * *

PO-1050
(5/69)

UNITED STATES PATENT OFFICE
CERTIFICATE OF CORRECTION

Patent No. 3,738,790　　　　　　　　Dated June 12, 1973

Inventor(s) Violette et al

It is certified that error appears in the above-identified patent and that said Letters Patent are hereby corrected as shown below:

At the title page, left-hand column, insert--Assignee: International Paper Company, New York, N.Y.--; at the title page, left-hand column, Related U.S. Application Data, line 2, delete "June", insert--January--.

Signed and sealed this 13th day of May 1975.

(SEAL)
Attest:

RUTH C. MASON
Attesting Officer

C. MARSHALL DANN
Commissioner of Patents
and Trademarks